United States Patent [19]
Arakawa

[11] Patent Number: 4,893,522
[45] Date of Patent: Jan. 16, 1990

[54] ROTARY DAMPER

[75] Inventor: Masaru Arakawa, Chigasaki, Japan

[73] Assignee: Nifco, Inc., Yokohama, Japan

[21] Appl. No.: 213,872

[22] Filed: Jun. 30, 1988

[30] Foreign Application Priority Data

Jul. 10, 1987 [JP] Japan .................................. 62-171232

[51] Int. Cl.$^4$ .............................................. F16F 15/10
[52] U.S. Cl. .......................................... 74/574; 16/82; 188/290
[58] Field of Search ............. 74/574; 188/218 A, 290, 188/378; 16/82, 62, 52

[56] References Cited

U.S. PATENT DOCUMENTS

| 4,550,476 | 11/1985 | Omata | 188/290 X |
| 4,571,773 | 2/1986 | Yuda | 188/290 X |
| 4,576,252 | 3/1986 | Omata | 188/290 X |
| 4,614,004 | 9/1986 | Oshida | 188/290 X |
| 4,618,039 | 10/1986 | Omata | 16/82 X |
| 4,638,528 | 1/1987 | Omata | 16/82 |
| 4,694,530 | 9/1987 | Foggini | 16/82 |
| 4,697,673 | 10/1987 | Omata | 188/290 X |

FOREIGN PATENT DOCUMENTS

| 3726031 | 2/1988 | Fed. Rep. of Germany | 188/290 |
| 59-193503 | 11/1984 | Japan . | |
| 1036976 | 8/1983 | U.S.S.R. | 188/290 |

Primary Examiner—Rodney M. Lindsey
Attorney, Agent, or Firm—Schwartz & Weinrieb

[57] ABSTRACT

A rotary damper includes a cylindrical rotor for receiving a torque input, a housing having a shaft disposed within the cylindrical rotor and a cylindrical wall surrounding the shaft, a viscous fluid interposed between the cylindrical rotor and the housing shaft, a coil spring provided between the inner periphery of the cylindrical wall and the outer periphery of the cylindrical rotor and having one end secured to the housing and the other end secured to the cylindrical rotor, a cover secured to an open end of the cylindrical wall and having an inner surface facing the end surface of the cylindrical rotor, an excursion groove formed within the inner surface of the cover or within an end surface of the cylindrical rotor and having an end portion defined as a heart-like cam groove, and an operating pin provided upon the cover or upon the cylindrical rotor and capable of excursion along the excursion groove. The coil spring is wound as a result of rotation caused by means of the torque input received by means of the cylindrical rotor.

12 Claims, 3 Drawing Sheets

ROTARY DAMPER

FIELD OF THE INVENTION

This invention relates to a rotary damper and, more particularly, to a rotary damper which comprises locking means including an excursion groove having a heart-like cam groove at one end and an operating pin received within and effecting an excursion along the excursion groove, and which can retain a pull-out type or rotary ash tray or other small article container within an automobile compartment or the like at a closed state or retain a rotary cassette lid or door of a tape recorder or a video cassette recorder in a closed state, while releasing the retained closed state of the ash tray, cassette lid or door as a result of a further pushing-in movement thereof, and a spring for pushing out or moving the ash tray, cassette lid or door to an open state.

DESCRIPTION OF THE PRIOR ART

Japanese Patent Public Disclosure Sho 59-193503 discloses a rotary damper, which includes the locking means and spring as noted above. This rotary damper comprises locking means which includes a pinion for receiving a torque input, a spring to be wound from one end thereof as a result of the rotation of the pinion caused by means of the torque input, an excursion groove formed within the top surface of the pinion and having a heart-like cam groove at one end thereof and an operating pin capable of accomplishing an excursion along the excursion groove, a brake disc immersed in oil for braking the rotation of the pinion, and a casing accommodating part of the pinion, spring, locking means and the brake disk. Thus, by merely providing the rotary damper as well as a rack, a gear and a sector gear coupled to the pinion of the rotary damper between a retainer, for slidably and rotatably supporting an ash tray or the like, and the ash tray or the like, or between the body of a tape recorder or video cassette recorder with a cassette lid or door pivoted thereto, and the cassette lid or door, it is possible to permit the ash tray or small article container to be pushed out or moved in accordance with a controlled movement mode or to permit the cassette lid or door to be opened in accordance with a controlled movement mode, as well as to permit the ash tray, small article container, cassette lid or door to be held in the closed or open state.

With the above rotary damper, however, the spring, pinion and brake disk are assembled one by one, so that the assembly process is very time-consuming.

OBJECT OF THE INVENTION

An object of the invention is to provide a rotary damper, which comprises a reduced number of components and which can be readily assembled.

SUMMARY OF THE INVENTION

The rotary damper according to the invention comprises a cylindrical rotor for receiving a torque input, a housing having an axial shaft disposed interiorly within an inner peripheral portion of the cylindrical rotor and a cylindrical wall portion surrounding the shaft and cylindrical rotor, a viscous fluid interposed between the inner peripheral surface of the cylindrical rotor and the outer peripheral surface of the shaft of the housing, a coil spring interposed between the inner periphery of the cylindrical wall of the housing and the outer periphery of the cylindrical rotor and having one end secured to the housing and the other end secured to the cylindrical rotor, the coil spring being wound as a result of rotation caused by means of a torque input, a cover secured to an open end portion of the cylindrical wall of the housing and having an inner surface disposed opposite an end surface of the cylindrical rotor, an excursion groove formed within either one of the inner surface of the cover or the end surface of the cylindrical rotor and having an end portion thereof formed as a heart-like cam groove, and an operating pin provided upon the other one of the cover and cylindrical rotor and capable of accomplishing an excursion movement along the excursion groove.

In order to assemble the rotary damper, the coil spring is inserted between the inner peripheral surface of the cylindrical wall of the housing and the outer peripheral surface of the cylindrical rotor, an end of the coil spring is secured to the housing, viscous oil is applied to one or both of the inner peripheral surface of the cylindrical rotor and the outer peripheral surface of the shaft of the housing, and the cylindrical rotor is inserted into a space defined by means of the coil spring while mounting the inner peripheral surface of the cylindrical rotor upon the outer peripheral surface of the shaft, and coupling the other end of the coil spring to the cylindrical rotor, so that the coil spring is wound as a result of rotation of the cylindrical rotor caused by means of a torque input. Then, the operating pin is mounted upon the end surface of the rotor or upon the inner surface of the cover, the cover is mounted upon the housing so as to close the open end of the cylindrical wall of the housing, and the operating pin is inserted within the excursion groove.

When the open ash tray, small article container, cassette lid or door is moved forward its closed position, the cylindrical rotor is rotated by means of the torque input so as to wind the coil spring. Also, when the closing operation is completed, the operating pin is retained within the heart-like cam groove portion of the excursion groove, so that the ash tray, small article container, cassette lid or door is locked in the closed state against the restoring force of the coil spring.

In order to open the closed ash tray, samll article container, cassette lid or door, it is pushed inwardly to a small degree. As a result, the operating pin is moved out of its retained state within the heartlike cam groove portion, so that the cylindrical rotor is rotated in the reverse direction by means of the restoring force of the coil spring, so that the ash tray, small article container, cassette lid or door is moved forward its open position. Since the viscous fluid is present between the inner peripheral surface of the cylindrical rotor and the outer peripheral surface of the shaft of the housing and since the cylindrical rotor is rotated in the reverse direction against the viscosity of the viscous fluid, the ash tray, small article container, cassette lid or door opens quietly at a reduced rate of speed.

BRIEF DESCRIPTION OF THE DRAWINGS

The above and other objects and features of the invention will become more apparent from the following detailed description with reference to the accompanying drawings wherein.

DETAILED DESCRIPTION OF THE PREFERRED EMBODIMENTS

Figure 1:
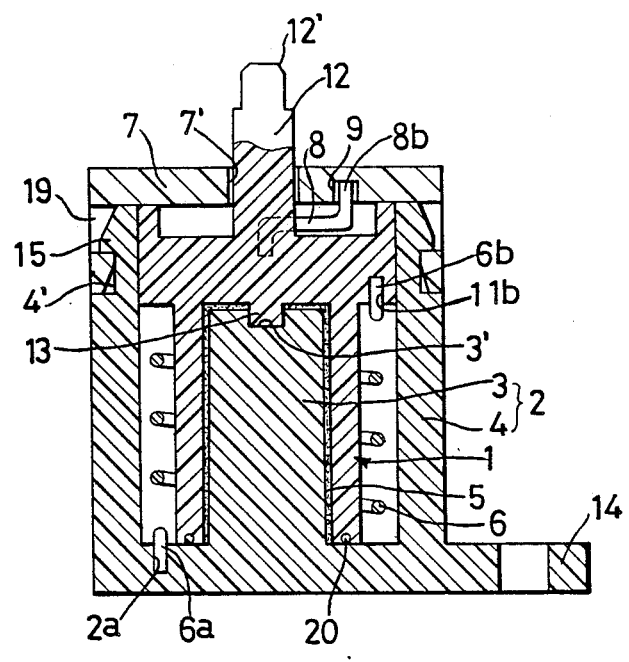
FIG. 1 is a sectional view showing an embodiment of the rotary damper according to the invention.
Figure 2:
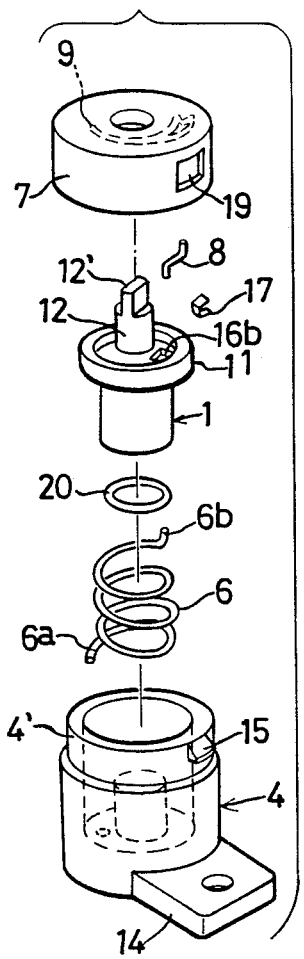
FIG. 2 is an exploded perspective view showing the rotary damper in FIG. 1.
Figure 3:
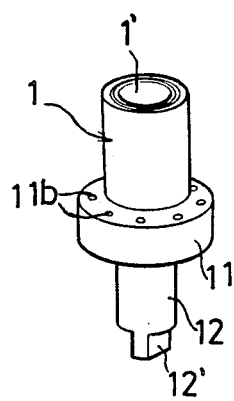
FIG. 3 is a perspective view showing the cylindrical rotor of the rotary damper of FIG. 1 viewed from the underside thereof.
Figure 4:
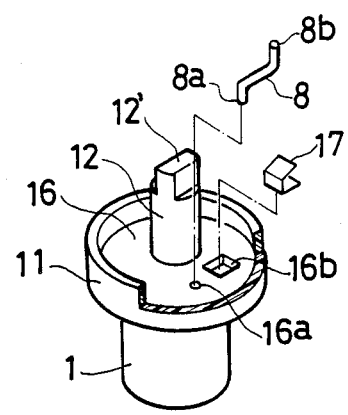
FIG. 4 is a perspective view, partly broken away, showing the manner of installing an operating pin and a spring upon the cylindrical rotor of the rotary damper shown in FIG. 1.
Figure 5:
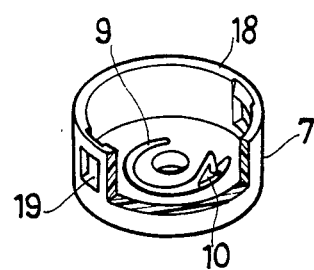
FIG. 5 is a perspective view, partly broken away, showing the cover of the rotary damper of FIG. 1 viewed from the underside thereof.

Referring to the Figures, reference numeral 1 designates a cylindrical rotor, numeral 2 designates a housing with an axial shaft 3 disposed interiorly within the inner peripheral surface 1' of the cylindrical rotor 1 and a tubular or annular cylindrical wall 4 surrounding the shaft 3 at a radially spaced location with respect thereto so as to define an annular space therebetween, numeral 5 designates a viscous fluid, numeral 6 designates a coil spring, numeral 7 designates a cover, numeral 8 designates an operating pin, numeral 9 designates an excursion groove, and numeral 10 designates a heart-like cam groove portion formed at one end of the excursion groove 9. The cylindrical rotor 1, housing 2 and cover 7 are respective plastic moldings.

In accordance with a first embodiment shown in FIGS. 1 to 5, the cylindrical rotor 1 has a large diameter portion 11 which is snugly disposed within the inner peripheral surface portion of the tubular cylindrical wall 4 of the housing 2. An input shaft 12 for receiving a torque input projects upwardly from the central portion of the large diameter portion 11 so as to extend through a central hole 7' of the cover 7. Between the inner peripheral surface 1' of the cylindrical rotor 1 and the outer peripheral surface of the shaft 3 of the housing 2, there is defined a small gap, which is filled with a viscous fluid 5; for example, silicone oil.

The cylindrical wall of the cylindrical rotor is open at the lower end thereof and closed at the upper end thereof, and the upper end wall is provided with a dependent projection 13 projecting downwardly into the cylinder. The dependent projection 13 is disposed within a circular recess 3' formed within the top surface of the shaft 3 of the housing 2.

The cylindrical wall 4 of the housing 2 is open at the upper end thereof and closed at the lower end thereof, and the wall closing the lower end has a laterally extending projection serving as a bracket 14 for securing the rotary damper to a suitable support surface, not shown. The outer peripheral surface of the cylindrical wall 4 has a reduced-diameter portion 4' adjacent to the upper end thereof, and the outer peripheral surface of the reduced-diameter portion 4' has a plurality of circumferentially spaced-apart pawls 15. These pawls are used to retain the cover 7 upon the housing 2 in a snap-fit mode as will be described later.

The coil spring 6 has an inner diameter slightly greater than the outer diameter of the cylindrical rotor 1, and has axial projections 6a, 6b at opposite ends thereof. The projecting 6a, projecting downwardly, is disposed within a blind hole 2a formed within the bottom wall of the housing 2 and is surrounded by means of the cylindrical wall 4.

In accordance with the structure of the cylindrical rotor 1 of this embodiment, the lower surface of the large diameter portion 11 has a plurality of, for example, eight, circumferentially spaced-apart blind holes 11b, within one of which the upwardly extending projection 6b of the coil spring is received. The excursion groove 9, having the heart-like cam groove portion 10 provided at one end thereof, is provided either within the inner surface of the cover 7 or the upper surface of the large diameter portion of the cylindrical rotor 1, while the operating pin 8 is provided upon the other one of these surfaces. In this embodiment, the excursion groove 9 is provided upon the inner surface of the cover 7, so that the operating pin 8 is mounted upon the upper surface of the large diameter portion of the cylindrical rotor 1. For this reason, the upper surface of the cylindrical rotor 1 facing the inner surface of the cover 7, that is, the upper surface of the large diameter portion 11, is formed with an annular recess 16 surrounding the input shaft 12, the bottom of the recess 16 is formed with a hole 16a within which one end 8a of the operating pin 8, bent in a crank-like form, is received, and a recess 16b, within which a spring 17 for upwardly biasing an intermediate portion of the pin 8 is received. The spring 17 consists of a leaf spring bent into a channel-shaped form. The lower portion of the spring 17 is received within the recess 16b, and the upper portion upwardly biases an intermediate portion of the pin 8, thus urging the other end 8b of the pin 8 against the bottom of the excursion groove 9.

The cover 7 has a peripheral wall 18 which is adapted to overlap the reduced-diameter portion 4' of the cylindrical wall 4 of the housing 2 and has windows 19, which are formed at positions corresponding to and accommodating the pawls 15 of the reduced-diameter portion 4'. When the cover 7 is mounted upon the cylindrical wall 4 of the housing 2 with the windows 19 registered with the pawls 15, the peripheral wall 18 rides over the pawls 15 and is flexed slightly outwardly. When the inner surface of the cover 7 is brought into contact with the shoulder portion of the cylindrical wall 4 defined between the large and small diameter portions thereof, the pawls 15 are snap fitted within the windows 19. Thus, the cover 7 is secured to the housing 2 such that it is incapable of detachment from and rotation with respect to the housing 2.

In order to assemble the rotary damper, the coil spring 6 is accommodated interiorly of the cylindrical wall 4 of the housing 2 with its downward axial projection 6a received within the blind hole 2a of the housing 2, the viscous fluid 5 is coated upon either one or both of the inner peripheral surface 1' of the cylindrical rotor 1 and the outer peripheral surface of the shaft 3 of the housing 2, and the cylindrical rotor 1 is mounted upon the shaft 3, whereby the cylindrical rotor 1 is accommodated within the space defined by means of the coil spring 6, the upward axial projection 6b of the coil spring 6 is inserted within a predetermined one of the blind holes 11b of the large diameter portion 11 of the rotor 1, the projection 13 of rotor 1 is mounted within the recess 3' formed within the upper surface of the shaft 3, and the outer peripheral surface of the large diameter portion 11 of the cylindrical rotor 1 is disposed within the reduced-diameter portion 4' of the cylindrical wall 4 of the housing 2.

Subsequently, the center hole 7' of the cover 7 is disposed about the input shaft 12 of the cylindrical rotor 1, and the coil spring 6 is slightly wound by means of rotating the cylindrical rotor 1 by means of the input shaft 12. Thus, the coil spring is preliminarily loaded, and in this state the cover 7 is lowered such that the upwardly projecting end 8b of the operating pin 8 mounted on the cylindrical rotor projects into an end portion of the excursion groove 9 which is free from the heart-like cam groove 10, whereby the cover 7 is secured to the housing 2 by means of the pawls 15 and windows 19.

When the cylindrical rotor 1 is mounted within the housing 2, the position of the upwardly projecting end 8b of the operating pin 8 and the position of the end portion of the excursion groove 9 are freed from the heart-like cam groove 10 portion formed within the inner surface of the cover 7 which is coupled to the cylindrical wall 4 of the housing 2. Thus, the load applied to the coil spring 6 can be controlled to a predetermined degree by appropriately selecting a particular one of the blind holes 11b of the large diameter portion 11 of rotor 1 within which the upward axial projection 6b of the coil spring 6 is received. As a result of this preliminary loading, it is possible to appropriately determine the magnitude of the biasing force of the coil spring 6 upon an ash tray, small article container, cassette lid or door acting in an opening direction and the speed with which the closure moves from the closed state to the open state.

It is suitable to form an annular groove within the lower end of the cylindrical rotor 1, fit an O-ring 20 within the groove and have the O-ring 20 make contact with the bottom wall of the housing 2 so as to effect a seal and prevent leakage of the viscous fluid 5 to the outside.

Figure 6:
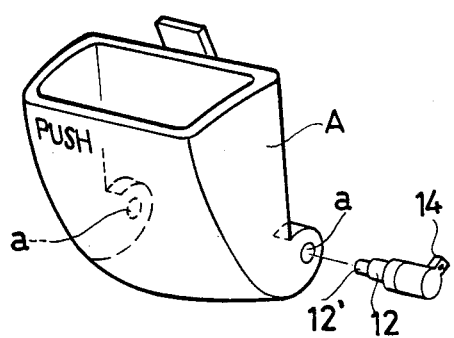
FIG. 6 is a view showing a rotary damper according to the invention to be mounted within a small article container.

For use of the rotary damper, a pinion may be mounted upon an attachment section 12' provided upon the free end of the input shaft 12 such as, for example, an angular shaft, an oval shaft of the like, and in this case a straight or arcuate rack or circular or sector gear may be meshed with the pinion. Then, the ash tray, small article container, cassette lid or door is pushed slightly inwardly beyond. As a result, it is caused to move or rotate by means of the restoring force of the coil spring so as to be projected outwardly to its open state. According to the invention, however, the movement or rotation to the open state can be caused without use of a pinion, rack, gear, or the like by using the input shaft 12 as a rotary shaft for the small article container or the like. More particularly, in FIGS. 6 and 7 a retainer shaft is inserted within one of two opposite side horizontal bearing holes a of a small article container A, which is pivoted downwardly so as to move out of the retainer to an open state, and the input shaft 12 of the rotary damper secured horizontally to the retainer by means of the is inserted into the other bearing hole, the attachment section 12' being engaged within a recess having the same sectional profile as that of section 12' formed within the bearing hole.

Figure 8:
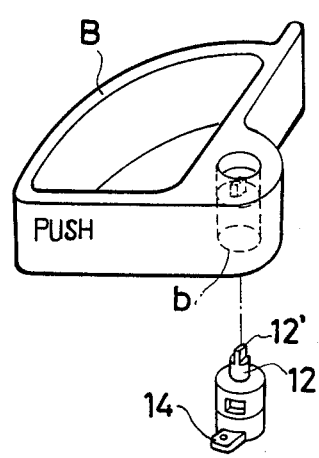
FIG. 8 is a view showing the manner of mounting a rotary damper according to the invention upon an ash tray.
Figure 9:
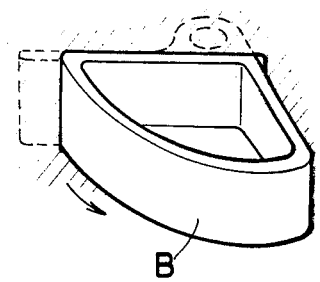
FIG. 9 is a perspective view showing the ash tray of FIG. 8 in an outwardly projected state.

In FIGS. 8 and 9, the input shaft 12 of the rotary damper secured vertically to the retainer by means of the bracket 14 is inserted within a bearing hole b defined within a sector-shaped ash tray B which is pivoted horizontally so as to move out of the retainer to its open state, and likewise the attachment section 12' is engaged within the recess moving the same sectional profile defined within the bearing hole.

Figure 7:
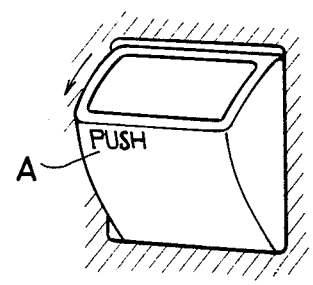
FIG. 7 is a perspective view showing the small article container of FIG. 6 in an open state.
Figure 10:
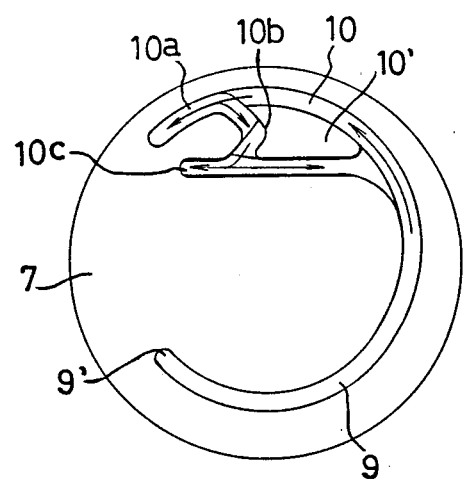
FIG. 10 is a view explaining the operation of the excursion groove of the rotary damper according to the invention.

Thus, when the small article container or ash tray is in a projecteded open state as shown in FIG. 7 or 9, the end of the operating pin 8 is located at the end 9' of the excursion groove 9 which is free or remote from the heart-like cam groove 10. By pushing the small article container or ash tray from this state to the closed state, the cylindrical rotor 1 receives rotational input from the input shaft 12 so as to be rotated in the counterclockwise direction as may be viewed in FIG. 10, together with the operating pin 8, so that the end 8b of the operating pin executes an excursion along the excursion groove 9. Slightly before reaching the closed state, the end 8b of the pin reaches the heart-like cam groove portion 10 constituting a one-way passage around a heart-like island 10'. When the closed state is overshot, the end 8b proceeds along one side of the heart-like island 10', and with subsequent pushing it enters to a deeper blind extension passage 10a at which it is stopped so that it cannot be pushed inwardly any further. During this time, the coil spring 6 is wound by means of the axial projection 6b so as to store a restoring force. When the ash tray is released, the coil spring 6 tends to cause counterclockwise rotation of the cylindrical rotor 1 under the influence of the restoring force. With a slight counterclockwise rotation of the cylindrical rotor, the end 8b of the operating pin returns along the extension passage 10a so as to enter a portion leading to a depressed region 10b defined within the heart-like island. Within the depressed region, the end 8b is retained within the depressed portion 10b so as to stop rotation of the coil spring in the counterclockwise direction. At this time, the small article container, ash tray, or the like is retained in its closed state.

In order to open the small article container, ash tray, or the like from the closed state, it is pushed slightly inwardly by means of one's hand and then released. As a result, the coil spring 6 is rotated slightly further in the counterclockwise direction. As a result, the end 8b of the operating pin held within the depressed portion 10b is moved out of the depressed portion 10b and moves into a deeper blind passage portion 10c whereby the coil spring causes the cylindrical rotor to be rotated in the counterclockwise direction by means of its restoring force. Thus, the end 8b moves along a progressively shallower portion extending along the other side of the heart-like island and enters a deeper so as to return along the excursion groove 9 toward the other end 9', whereby the small article container or ash tray is opened. The cylindrical rotor 1 receives a braking action at this time because it has to be rotated against the viscosity of the visous fluid 5 present between its inner peripheral surface and the outer peripheral surface of the shaft 3.

Figure 11:
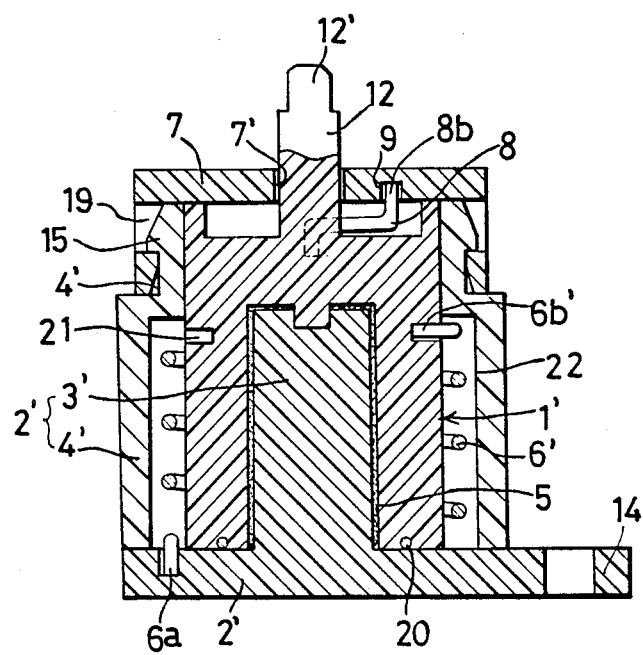
FIG. 11 is a sectional view showing a further embodiment of the rotary damper according to the invention.

FIG. 11 shows a different embodiment of the rotary damper according to the invention. This embodiment is different from the previous embodiments of FIGS. 1 to 5 in that the cylindrical rotor 1 has a cylindrical outer configuration without any large diameter portion. For this reason, the upper axial projection 6b of the coil spring 6 is bent horizontally so as to be received within one of a plurality of blind holes 21 formed circumferentially at uniform intervals within an upper portion of the outer peripheral surface of the cylindrical rotor 1. Furthermore, the housing 2 has a large diameter portion 22 with a larger inner diameter for accommodating the coil spring 6 between the cylindrical wall 4 and the outer peripheral surface of cylindrical rotor 1. The housing 2 consists of separate portions, one constituting the cylindrical wall 4 with the large diameter portion 22 and the other comprising a bottom wall 2' with the shaft 3 and the bracket 14. The lower end of the cylindrical wall 4 is united by means of high frequency welding to the bottom wall 2' so that the cylindrical wall 4 is coaxial with the shaft 3. Other structures and functions are the same as those of the previous embodiment of FIGS. 1 to 5.

As has been shown in the foregoing, according to the invention it is possible to provide a rotary damper which has a reduced number of components and can be readily assembled.

Obviously, many modifications and variations of the present invention are possible in light of the above teachings. It is therefore to be understood that within the scope of the appended claims, the present invention may be practiced otherwise than as specifically described herein.

What is claimed is:

1. A rotary damper, which comprises:
    a cylindrical rotor for receiving a torque input;
    a bore defined within a first end of said cylindrical rotor;
    a housing having a shaft disposed within said bore of said cylindrical rotor and a cylindrical wall surrounding said shaft;
    a viscous fluid interposed between sidewall portions of said bore of said cylindrical rotor and said shaft of said housing;
    a coil spring, interposed between said cylindrical wall of said housing and said cylindrical rotor and having one end secured to said housing and another end secured to said cylindrical rotor, so as to be wound up as a result of rotation of said cylindrical rotor caused by said torque input;
    a cover secured to an open end of said cylindrical wall of said housing and having an inner surface facing a second end of said cylindrical rotor;
    an excursion groove defined within said inner surface of said cover and having an end portion with a heart-shaped cam groove formed therein; and
    an operating pin having one end thereof fixedly secured within said cylindrical rotor and another end thereof disposed within said excursion groove of said cover so as to be capable of excursion along said excursion groove.

2. A rotary damper as set forth in claim 1, wherein:
    said cylindrical rotor, said housing, and said cover are fabricated from a plastic material.

3. A rotary damper as set forth in claim 1, wherein:
    said operating pin comprises a central portion; and said one and another ends thereof project outwardly, in opposite directions, from opposite ends of said central portion.

4. A rotary damper as set forth in claim 1, wherein:
    said cylindrical rotor comprises a first small diameter portion, and a second large diameter portion;
    an outer peripheral surface of said second large diameter portion of said cylindrical rotor being in contact with an inner peripheral surface of said cylindrical wall of said housing; and
    an outer peripheral surface of said first small diameter portion of said cylindrical rotor being radially spaced from said inner peripheral surface of said cylindrical wall of said housing so as to define therewith an annular space within which said coil spring is disposed.

5. A rotary damper as set forth in claim 1, further comprising:
    an axial through-bore defined within said cover; and
    an axial input shaft integrally formed upon said second end of said cylindrical rotor and extending through said through-bore of said cover so as to receive said torque input.

6. A rotary damper as set forth in claim 1, wherein:
    said viscous fluid comprises silicone oil.

7. A rotary damper as set forth in claim 1, further comprising:
    bracket means integrally formed with said housing for mounting said rotary damper upon a support surface.

8. A rotary damper as set forth in claim 1, further comprising:
    recess means defined within said cover; and
    pawl means integrally formed upon said housing for snap-fitting engagement within said recess means of said cover so as to secure said cover upon said housing.

9. A rotary damper as set forth in claim 1, further comprising:
    a plurality of circumferentially spaced holes formed within said rotor and within one of which said another end of said coil spring is selectively disposed so as to control the biasing force of said coil spring acting upon said cylindrical rotor.

10. A rotary damper as set forth in claim 1, further comprising:
    O-ring sealing means disposed within said first end of said cylindrical rotor and annularly surrounding said viscous fluid for preventing leakage of said viscous fluid exteriorly of said damper.

11. A rotary damper as set forth in claim 1, wherein:
    said cylindrical rotor is operatively connected to an ashtray receptacle for controlling the opening and closing movements thereof.

12. A rotary damper as set forth in claim 1, wherein:
    said housing comprises a first small diameter portion having an inner peripheral surface thereof in contact with an outer peripheral surface of said rotor, and a second large diameter portion radially spaced from said outer peripheral surface of said rotor so as to define therewith an annular space within which said coil spring is disposed.

* * * * *